United States Patent

[11] 3,611,057

| [72] | Inventors | Alan G. Cooper;<br>John L. Moresi; Gediminas John Velyvis,<br>all of North Adams, Mass. |
|---|---|---|
| [21] | Appl. No. | 876,718 |
| [22] | Filed | Nov. 14, 1969 |
| [45] | Patented | Oct. 5, 1971 |
| [73] | Assignee | Sprague Electric Company<br>North Adams, Mass. |

[54] HERMETICALLY SEALED, WET ELECTROLYTIC CAPACITOR
5 Claims, 3 Drawing Figs.

| [52] | U.S. Cl. | 317/230,<br>29/570 |
|---|---|---|
| [51] | Int. Cl. | H01g 9/06 |
| [50] | Field of Search | 317/230,<br>231, 233 |

[56] References Cited
UNITED STATES PATENTS

| 3,264,015 | 8/1966 | Mayers | 317/230 X |
|---|---|---|---|
| 3,264,708 | 8/1966 | Diggens | 317/230 |
| 3,275,901 | 9/1966 | Merritt et al. | 317/230 |
| 3,461,355 | 8/1969 | Fry | 317/230 |
| 3,515,950 | 6/1970 | Koons et al. | 317/230 |

*Primary Examiner*—James D. Kallam
*Attorneys*—Connolly and Hutz, Vincent H. Sweeney, James Paul O'Sullivan and David R. Thornton

ABSTRACT: A wet pellet electrolytic tantalum capacitor having a single matched hermetic glass to tantalum seal and provided with a reverse voltage capability.

PATENTED OCT 5 1971         3,611,057

HERMETICALLY SEALED, WET ELECTROLYTIC CAPACITOR

BACKGROUND OF THE INVENTION

In general this invention relates to a hermetically sealed wet electrolytic capacitor and more specifically to a wet pellet, sintered anode, tantalum capacitor having a single matched hermetic glass to tantalum seal together with a reverse voltage capability.

While the invention may be applied to other film forming metals (known in the art as value metals) such as titanium and niobium, the advantages of tantalum are so great that it is preferred, and the invention will be described in connection therewith. The use of tantalum in electrolytic capacitors is preferred because of the superior dielectric film forming characteristics of tantalum. The superior ability of tantalum to form a dielectric oxide film gives tantalum electrolytic capacitors a considerable size advantage over other types of electrolytic capacitors. Therefore tantalum electrolytic capacitors having a given capacitance rating can be manufactured so as to be smaller than other electrolytic capacitors. Capacitors encased in tantalum containers have a reverse voltage capability because of the inertness and film forming ability of tantalum. Another advantage of tantalum is its greater resistance to chemical corrosion thereby permitting the use of stronger electrolytes.

One of the prior art problems encountered in forming a wet electrolytic tantalum capacitor has been the production of an effective hermetic seal. The seal must be strong enough to cope with the electrolyte creepage which occurs along the boundaries of the different materials employed as the sealing means. Such creepage results in a loss of electrolyte and subsequent deterioration of the electrical characteristics of the device. The matched glass-to-metal seal provides an effective hermetic seal where the glass has substantially the same coefficient of thermal expansion as the metal.

A matched hermetic glass-to-metal seal can be formed within a tantalum retaining ring; however, difficulty arises when the retaining ring is welded to the capacitor case. Tantalum is ordinarily welded by a method such as the tungsten inert gas (TIG) welding process which requires temperatures in the range of 3,000° C. However, applying this much concentrated heat to the tantalum end cap inevitably destroys the hermetic glass to tantalum seal in the end cap.

Therefore it is an object of this invention to provide a single effective hermetic seal for a wet tantalum electrolytic capacitor.

It is a further object of this invention to provide an electrolytic capacitor having a reverse voltage capability.

SUMMARY OF THE INVENTION

A tantalum wet electrolytic capacitor having a reverse voltage capability together with a single matched hermetic glass to tantalum seal is provided in accordance with this invention. Reverse voltage capability is provided by the use of an all tantalum capacitor case. The substantially greater film forming ability of tantalum together with its inertness provides the reverse voltage capability of the unit.

Also a single matched hermetic glass to tantalum seal fused around a tantalum tube is formed as an integral part of the capacitor case thereby facilitating the insertion of the anode from the opposite end of the case. This permits the welding operation required to seal the tantalum capacitor case with a tantalum end cap to be performed at said opposite end of the case, thus eliminating any injury to the glass seal caused by the extreme heat required to weld tantalum. Electrical contact to the anode through the glass seal is made by means of a conducting riser protruding from the anode and extending within the tantalum tube so as to make electrical contact with the tube.

DESCRIPTION OF THE PREFERRED EMBODIMENT

Figure 1:
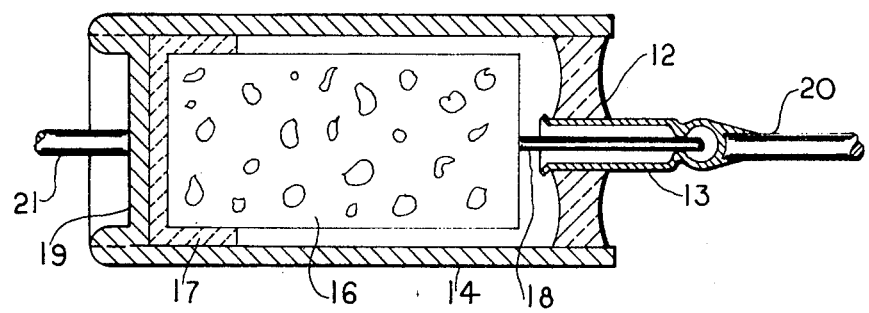
FIG. 1 shows a cross-sectional view of an electrolytic tantalum capacitor with closed tubulation formed in accordance with this invention.
Figure 2:
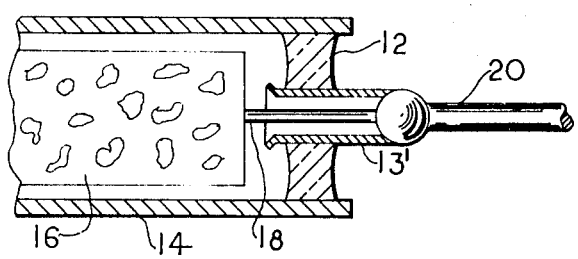
FIG. 2 shows a cross-sectional view of an alternate type of open tubulation which may be substituted for the closed tubulation illustrated in FIG. 1.

FIG. 1 shows one embodiment of the tantalum, wet pellet electrolytic capacitor of this invention. The glass seal 12 is formed as an integral part of the tantalum case 14. The inner component of glass seal 12 may be either the closed tantalum tubulation 13 as shown in FIG. 1 or the open tantalum tubulation 13' as shown in FIG. 2. A platinized layer is formed on the inside surface of tantalum case 14 in order to achieve the required cathodic capacitance as disclosed in P. Robinson et al., U.S. Pat. No. 3,082,360 issued Mar. 19, 1963. The porous tantalum anode 16 is formed by sintering a porous pellet of pressed tantalum powder in a high vacuum at temperatures in the order of 1,700°–2,100° C. An oxide coating is then formed over the surface area of anode 16 to provide the dielectric of the capacitor. Sintered tantalum anode 16 together with tantalum riser 18 is inserted from the open end of tantalum container 14 which is opposite the hermetically sealed end. Capacitor case 14 is filled with a suitable electrolyte of high conductivity, such as sulfuric acid.

Spacer 17 can be composed of any resilient inert material such as Teflon and is inserted in order to better position the end of anode 16, thereby making the structure more shock resistant. Tantalum end cap 19 is (TIG) welded to tantalum case 14 thereby hermetically sealing the capacitor. The end of closed tantalum tubulation 13 is welded to tantalum lead 18 by either resistance welding or some similar method, and then nickel lead 20 is welded to the closed off end of tubulation 13. If open end tubulation 13' FIG. 2 is utilized, anode riser 18 and tubulation 13' are fused by either TIG welding, plasma arc or similar methods so as to form a hermetic seal. Nickel lead 20 is then welded to the closed end of tubulation 13' by butt welding. Nickel lead 21 is welded to tantalum end cap 19 to provide the cathode lead for the capacitor.

Glass seal 12 fused around tubulation 13 is formed as an integral part of the tantalum capacitor case 14. This permits the insertion of anode 16 from that end of the capacitor case 14 opposite the glass metal seal 12. The tubulation technique allows the anode to make electrical contact with the tubulation by means of tantalum riser 18 which inserts into tubulation 13 when anode 16 is inserted into the capacitor case 14 case. The open end of the capacitor is hermetically sealed by welding tantalum end cap 19 to the capacitor case. The welding of the end cap is far enough removed from the hermetic glass seal so as not to injure or destroy it. Also the capacitor case can be adequately heat sinked so as to draw off excessive heat before hermetic glass seal 12 is destroyed or injured. The heat sinking has the added advantage of cooling the electrolyte thereby preventing any contamination during the welding process from the evaporation of the electrolyte.

The glass fused to form the matched hermetic glass seal must have a coefficient of thermal expansion substantially the same as the coefficient of thermal expansion for tantalum which is $6.5 \times 10^{16}/°$ C. in all sealing temperature ranges. The following are specific examples of compositions of glass which have proved satisfactory:

|  | Percent by weight |
|---|---|
| Example 1: | |
| BaO | 35 |
| $Al_2O_3$ | 25 |
| $B_2O_3$ | 40 |
| Example 2: | |
| BaO | 35 |
| $Al_2O_3$ | 25 |
| $B_2O_3$ | 35 |
| $CeO_3$ | 5 |

The aforementioned coefficients of thermal expansion of the glass material approximates very closely that of tantalum. The tantalum to glass to tantalum hermetic seal is fused in a substantially inert atmosphere in order to prevent embrittlement of the tantalum caused by excessive oxidation. The tantalum is not oxidized before fusion because the oxygen from the air and moisture which inherently contaminate the inert atmosphere is sufficient to form the necessary oxide coating on the tantalum. The oxide is necessary to the formation of a glass to tantalum seal because it is soluble in glass and adheres to the surface of the glass forming a good hermetic bond. The oxide bond acts as an effective hermetic seal regardless of the absence of compressive forces.

The hermetic matched glass seals formed in accordance with this invention are virtually leakproof. They exhibit a leak rate of less than $1 \times 10^{18}$cc. of He/sec. which is measured at or below 125° C. Also no change in the leak rate is exhibited after subjecting the seal to a thermal shock consisting of a 500° C. to ambient air quench. Also the seals are able to withstand an internal pressure of 1,000 p.s.i. without damage or deformation.

Figure 3:
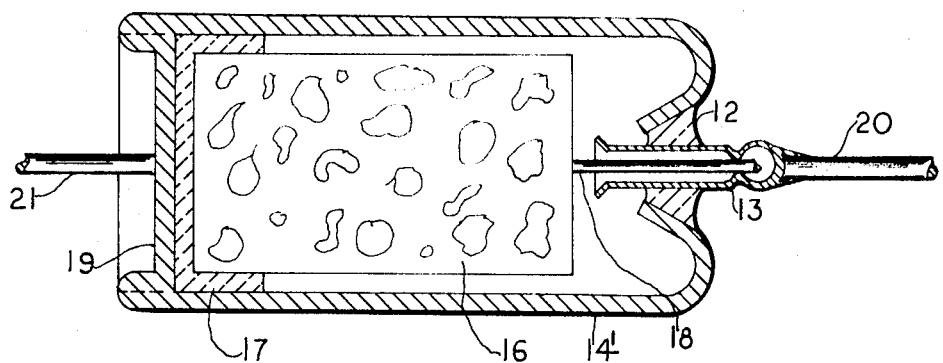
FIG. 3 shows a cross-sectional view of an alternate embodiment whereby the size of the capacitor illustrated in FIG. 1 may be increased with substantially the same hermetic glass seal.

FIG. 3 shows an alternate embodiment of the single-seal, wet pellet tantalum cased capacitor of this invention. Capacitors of larger physical size having substantially the same hermetic glass seal, may be formed in accordance with this particular embodiment. The reverse flared end of tantalum case 14' can be drawn by techniques known to the art and the capacitor is formed by the same process utilized in forming the capacitor of FIG. 1.

What is claimed is:

1. A wet electrolytic capacitor having reverse voltage capability comprising a tubular valve-metal container; a hermetic matched glass seal having a glass member thermally fused on its outer diameter into direct sealing engagement with one end of said container and thermally fused on its inner diameter to a metal tubular terminal which protrudes from the center of said seal, said glass member having a coefficient of thermal expansion substantially the same as said container and said terminal; a liquid electrolyte in said container; a porous anode of valve-metal immersed in said electrolyte and having a conducting riser projecting from said anode into said terminal and making electrical contact therewith; an end cap of the valve metal of said container welded to the other end of said container in sealing relation thereto.

2. The capacitor of claim 1 wherein said container, tubular terminal, end cap, anode and riser comprise metals from the group consisting of tantalum, titanium and niobium.

3. The capacitor of claim 1 wherein said electrolyte is sulfuric acid.

4. The capacitor of claim 1 wherein said end cap has a circular flange which is welded completely around the interior of said other end of said container.

5. The capacitor of claim 2 wherein said metal is tantalum.